(12) United States Patent
Raghuprasad

(10) Patent No.: US 7,972,203 B2
(45) Date of Patent: Jul. 5, 2011

(54) WINDSHIELD SAVER

(76) Inventor: Puthalath Koroth Raghuprasad, Odessa, TX (US)

( * ) Notice: Subject to any disclaimer, the term of this patent is extended or adjusted under 35 U.S.C. 154(b) by 680 days.

(21) Appl. No.: 11/775,941

(22) Filed: Jul. 11, 2007

(65) Prior Publication Data

US 2009/0017743 A1 Jan. 15, 2009

(51) Int. Cl.
*B24D 13/00* (2006.01)
*F04D 29/38* (2006.01)

(52) U.S. Cl. .................................. 454/69; 416/223 R

(58) Field of Classification Search .................. 454/69, 454/123, 901, 370, 155, 163; 416/223 R
See application file for complete search history.

(56) References Cited

U.S. PATENT DOCUMENTS

| | | | |
|---|---|---|---|
| 3,647,256 A | 3/1972 | Cox | |
| 3,695,674 A | 10/1972 | Baker | |
| 3,910,623 A | 10/1975 | McKeen | |
| 4,142,758 A | 3/1979 | Scaife | |
| 5,001,966 A | 3/1991 | McIntyre et al. | |
| 5,097,563 A * | 3/1992 | Cowan | 15/313 |
| 5,636,892 A | 6/1997 | Gordon | |
| 5,852,846 A | 12/1998 | Gonzalez | |
| 6,702,364 B2 | 3/2004 | Neel | |
| 6,827,555 B2 * | 12/2004 | Yang | 416/197 R |
| 6,899,369 B2 | 5/2005 | Neel | |
| 2004/0026953 A1 | 2/2004 | Neel | |
| 2004/0026954 A1 | 2/2004 | Neel | |
| 2008/0199321 A1 * | 8/2008 | Gigas et al. | 416/223 R |

FOREIGN PATENT DOCUMENTS

| | | | |
|---|---|---|---|
| GB | 2341787 | | 3/2000 |
| JP | 61110653 | | 5/1986 |
| JP | 04066363 A | * | 3/1992 |
| JP | 06156204 | | 11/1992 |
| RU | 2263586 | | 8/2005 |
| RU | 2004106253 | | 8/2005 |

OTHER PUBLICATIONS

English translation of Abstract JP 04066363A.*

* cited by examiner

*Primary Examiner* — Steve McAllister
*Assistant Examiner* — Helena Kosanovic
(74) *Attorney, Agent, or Firm* — David L King

(57) ABSTRACT

An air flow device for generating an air flow 30 across a windshield 4 of a vehicle 2, the air flow device has one or more means 10 for generating an air flow 32 located in proximity on a lateral end or side of the windshield 4, the one or more means 10 for generating an air flow 30 directs the flow of air laterally onto the windshield 4. The one or more means 10 for generating an air flow 30 has one or more fans 20 rotatable about an axis 22. Each fan 20 has a plurality of fan blades 24 for intaking air near the axis of rotation 22 of the fan blade 24, the fan blades 24 extend longitudinally having a cross section of increasing curvature to a substantially flattened unshaped terminal end 24E for directing the air flow 30 laterally. The one or more fans 20 can be driven by a single motor 25. Alternatively, each fan 20 may include a motor 25 for driving the fan blade 24.

8 Claims, 4 Drawing Sheets

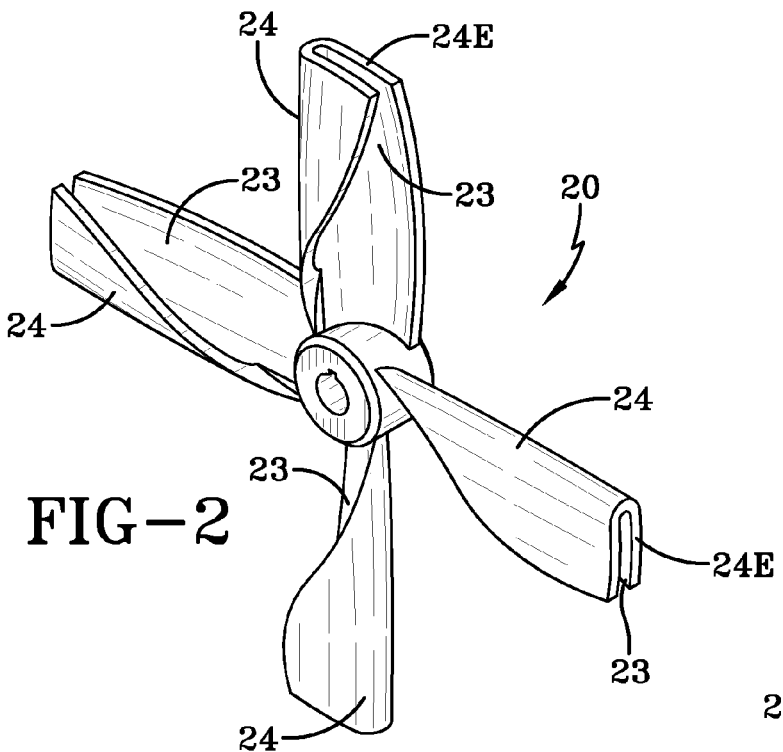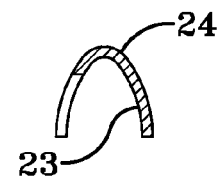
FIG-2B
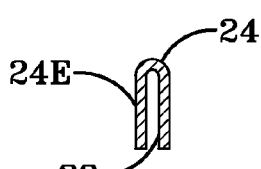
FIG-2C
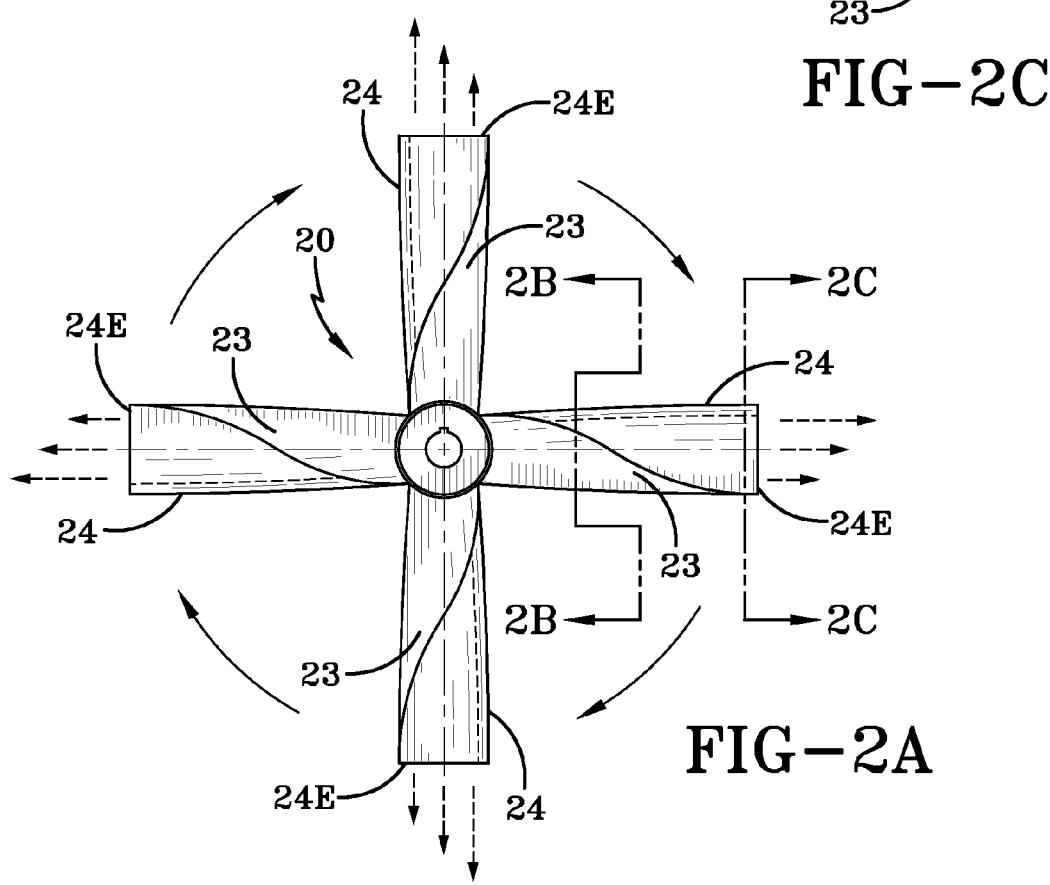

WINDSHIELD SAVER

TECHNICAL FIELD

The present invention relates to vehicle windshields generally, more specifically to a device to protect the windshield from rain, snow, insects and other airborne splatter.

BACKGROUND OF THE INVENTION

Since the earliest days of automobiles, back then nostalgically reminiscing, referred to as "horseless carriages", the driver in particular as well as the passengers struggled to see well in wet/muddy conditions.

Goggles soon became obstructed by flying debris. Later a windshield was provided and thereafter a wiper blade was invented to keep the windshield clear of raindrops and debris. Later on the vehicles came equipped with built-in windshield washer devices that could spray the windshield to assist in washing the bug splatter and other debris collected on to the windshield.

More recently, chemicals such as Rainx® have been developed that create a hydrophobic clear film on the windshield to make the raindrops disperse into small, very small droplets that rapidly are blown off the speeding vehicle, making the use of windshield wiper almost unnecessary at high speeds.

In the late 1990's, the Chevrolet Camaro introduced a low angle, curved windshield that similarly could rapidly expel water at very high speeds. As one can appreciate at speeds in excess of 80 miles per hour, the wiper blades have a tendency to be slow and the advantage of a windshield that remains clear at high speeds is a great advantage. This is true even if it is not wise to speed under such conditions. Nevertheless this high speed rain-free phenomenon would have tremendous value if it could be used at slower speeds.

Several prior art patents have proposed providing an air wiper for a vehicle which is capable of effectively blowing away rainwater: JP 06-156204; JP 61-110653 and RU 2004106253 all teach the use of an air compressor type device that expels air up onto a windshield in an attempt to create an air barrier to protect the windshield. U.S. Pat. No. 5,852,846 entitled "Windshield Airstream Deflector for Vehicles" similarly uses a multistage turbine in combination with an air flow duct to provide an air blanket to act as a shield to prevent rain, snow, sleet or freezing rain, insects or other airborne debris from accumulating on the windshield. In this prior art device the air flow can be heated to assist the wiper blades from becoming ice laden and ineffective in cold weather regions.

A similar concept is found in U.S. Pat. No. 5,001,966 entitled "Automobile Windscreen Cleaning System" that uses a foil coupled to a turbine or other high velocity, high pressure air source.

GB 2341787 entitled "Air Jet Windscreen Cleaners" has a turbine providing an air jet from the top of a windshield down or alternatively has a pair of wiper arms wherein the air jet flow causes what appears like conventional wiper blades to rise on a cushion of air and translate back and forth using air flow to clear the water.

All of these concepts clearly appreciate the value of air flow as a means to keep a windshield clean and every one has the air flow directed from under the hood or front bonnet to flow vertically upwardly or in case GB 2341787, vertically downwardly except when alternatively using the wipers semi-circular sweeping action.

These devices insure the airflow is uniformly covering the entire windshield with air flow and therefore appear to be a logical location for such air jets to be located. This, however, may not actually be the case for several reasons. A careful review of these prior art devices shows for the vertical flow path to result numerous small orifices or very long narrow slits have to be provided and in snowy, icy regions these jet openings can easily be blocked or frozen shut if covered by several inches of snow or a layer of ice. Ideally, to keep this from occurring the air must be heated in the winter to first de-ice itself and only then can the device function properly.

The present invention has a superior way of creating an air curtain or barrier across a windshield that can be achieved on each side of the windshield adjacent the pillars.

The present invention, while ideally suited for high pressure flows, can work very well with high volume lower pressure air flows by using a uniquely designed lateral flow device. This and other features of the invention are described in the following written description.

SUMMARY OF THE INVENTION

An air flow device for generating an air flow across a windshield of a vehicle is disclosed. The air flow device has one or more means for generating an air flow located in proximity on a lateral end or side of the windshield. The one or more means for generating an air flow directs the flow of air laterally onto the windshield. The one or more means for generating an air flow preferably has one or more fans rotatable about an axis. Each fan has a plurality of fan blades for intaking air near the axis of rotation of the fan blade, the fan blades extend longitudinally having a cross section of increasing curvature to a substantially flattened u-shaped terminal end for directing and accelerating the air flow laterally. The one or more fans can be driven by a single motor. Alternatively, each fan may include a motor for driving the fan blade.

The air flow device further has a fan housing having an air intake passage for receiving air and an air exhaust passage for directing the fan driven air laterally out onto the windshield wherein the fan housing forms a part of or is integral to a front pillar of the vehicle adjacent a lateral side of the windshield.

A method of generating an air flow laterally across a windshield has the steps of positioning a means for generating an air flow on each lateral side of the windshield; activating the means for generating an air flow; and directing the air flows from each means laterally across the windshield toward the center to create an air shield or barrier. The method of generating an air flow further includes the step of driving the vehicle and generating an air flow moving from bottom to top over the windshield to combine with the lateral flow of air to impart a vertically directed air flow velocity displacing a portion of the lateral flowing air over the top of the windshield. The windshield is preferably oriented at a low angle of 40 degrees or less. The means for generating an air flow provides a lateral air flow sufficient to clear a viewing area on each side of the windshield at speeds of 0 mph to less than 20 mph, at speeds of 20 mph or greater the combination of vehicle generated air flow and lateral air flow substantially clears the entire windshield.

BRIEF DESCRIPTION OF THE DRAWINGS

FIG. 2 is a perspective view of a fan for providing lateral air flow.

FIG. 2A is a plan view of the fan of FIG. 2.

FIG. 2B is a cross sectional view of a fan blade taken along lines 2B-2B from FIG. 2A.

FIG. 2C is a cross sectional view of the terminal of the fan blade taken along lines 2C-2C of FIG. 2A.

DETAILED DESCRIPTION OF THE INVENTION

Figure 1:
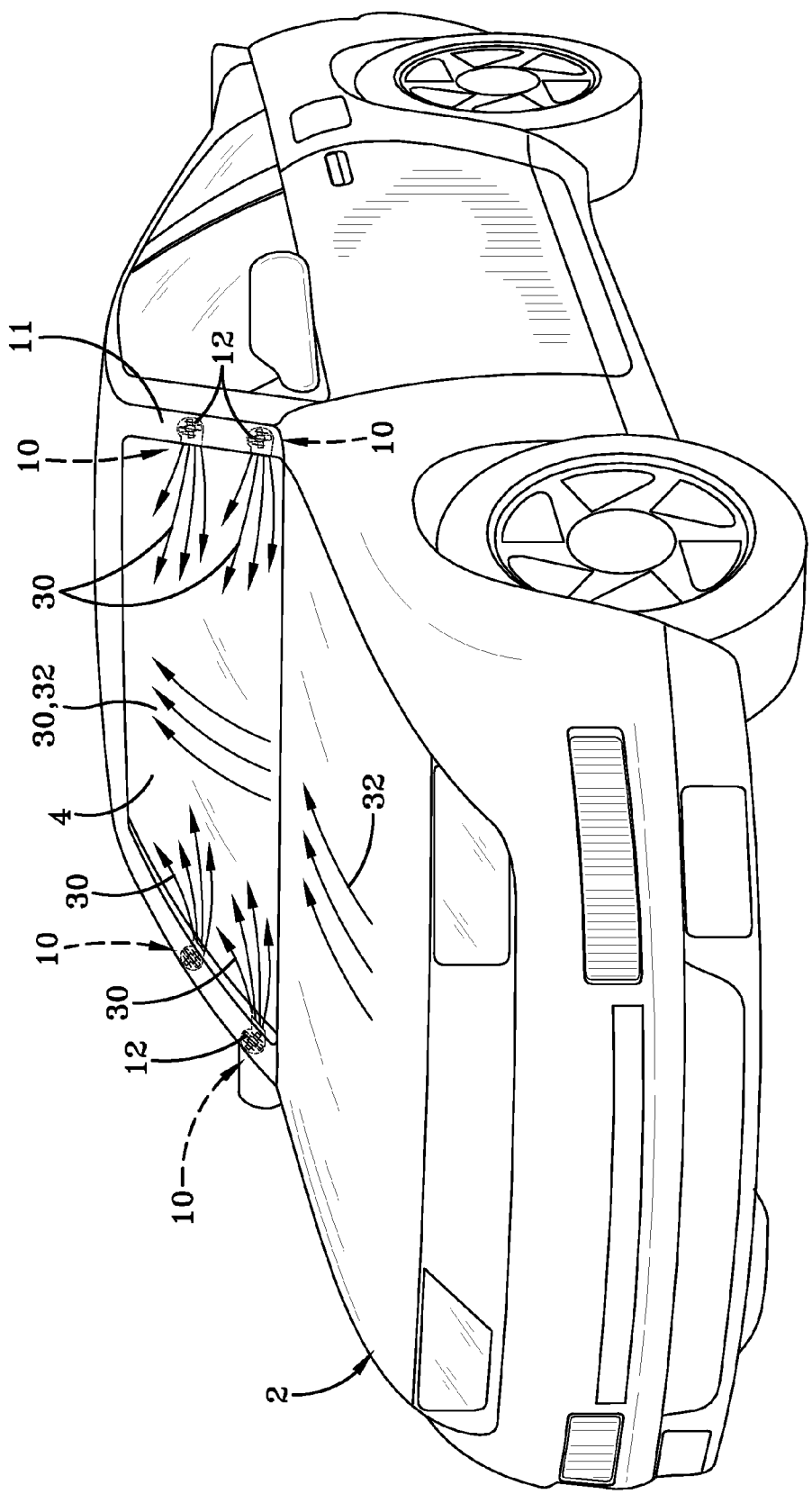
FIG. 1 is a perspective view of a vehicle incorporating an air flow device for generating an air flow across a windshield of a vehicle.

With reference to FIG. 1 a vehicle 2 is illustrated showing the front portion of the vehicle and the windshield 4. On each side of the windshield 4 is a front pillar 11 including air intake openings or passages 12 which will accept air into the openings and thereafter one or more means 10 for generating an air flow located within the pillar 11 are activated in such a way that the air is redirected to flow laterally across the windshield 4 as illustrated in FIG. 1.

In a preferred embodiment the means 10 for generating air flow consists of one or more fans 20 rotatable about an axis of rotation 22 as shown in FIGS. 1 and 2. Each fan 20 has a plurality of fan blades 24 for intaking air near the axis of rotation 22 of the fan blades 24 and thereafter turning the air along the internal surface 23 of the fan blades 24 such that the air is spinning with the directed velocity along a longitudinal length of a fan blade 24. At the terminal end 24E of the fan blade 24, the cross section turns into a flattened u-shape as illustrated in FIG. 2C. As such the air flowing out of the fan blade 24 is directed to spin out of the blade end 24E and therefore directed to flow in a direction radially outwardly from the end of the fan blade 24.

With reference to FIG. 2B, the air, as it impinges the center portion of the fan blade perpendicular to the fan blade 24 is impinged upon the flat internal surface 23 of the blade and as the curvature of the blade 24 extends over to form the open ended, flattened u-shape, the air is entrapped in the blade 24 as the blade 24 is spinning at a very high velocity.

Figure 3:
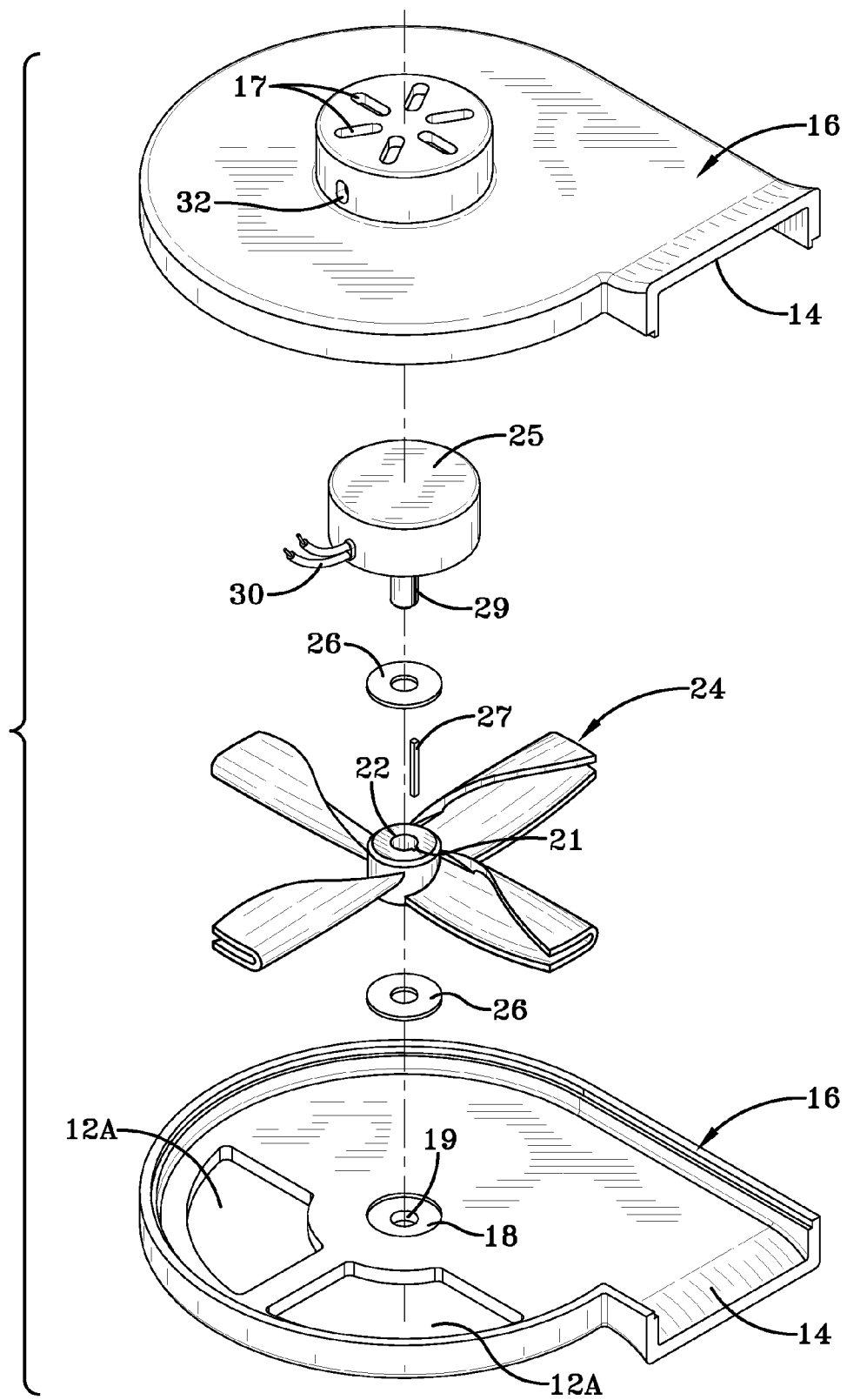
FIG. 3 is an exploded view of the device for generating an airflow showing the housing and fan with motor assembly.
Figure 4:
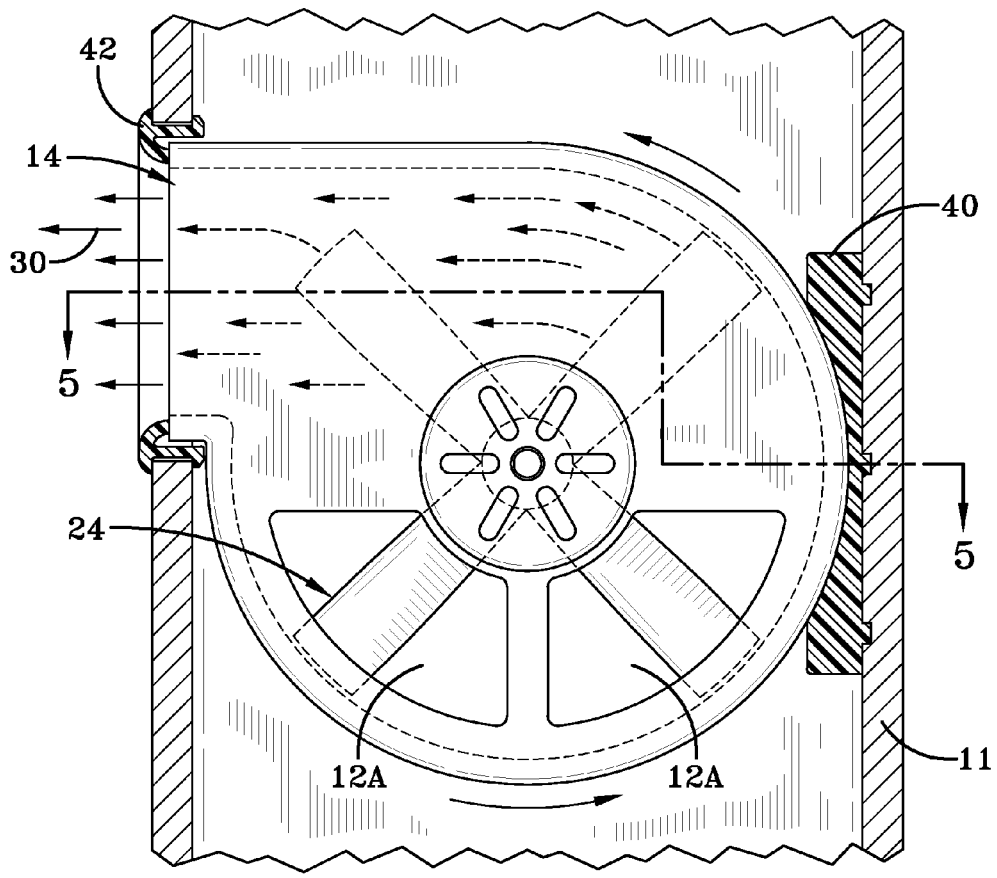
FIG. 4 is a cross sectional view of the housing holding a fan with fan motor for directing air flow laterally out an exhaust passage, the assembly being held in the front pillar of a vehicle.

This configuration provides the means 10 for turning the air flow from the inlet passages 12, shown in FIG. 1, 90 degrees to follow the path of the spinning, rotating blades 24. In order to control the air flow 30, further the fan blades 24 and motor 25 are preferably situated within a housing 16, the housing 16 provides a means of directing the flow from the inlet passage 12 to an exhaust or outlet passage 14 with preferably a flared out cross section that is facing towards the windshield 4. As shown in FIGS. 3 and 4, this provides a way of capturing the air flow and redirecting it across the windshield 4 in a virtually lateral direction. Preferably by providing a plurality of two or more such means 10 on each side of the windshield within the pillars 11 as illustrated in FIG. 1 the lateral air flow can be directed from both the driver's side and the passenger's side creating an air boundary or shield in front of the windshield 4.

Figure 5:
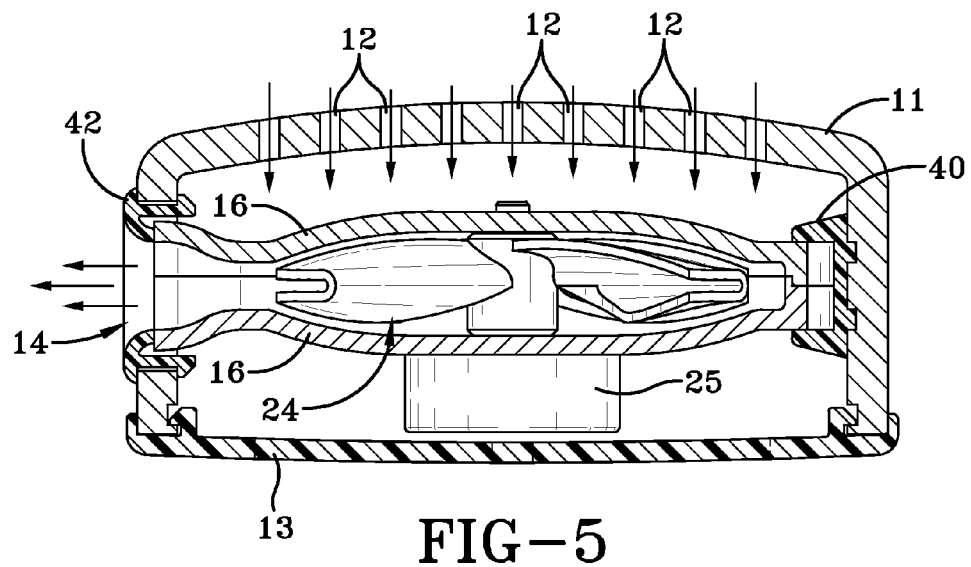
FIG. 5 is a cross-sectional view of the housing holding a fan with motor in the vehicle pillar from FIG. 4.

FIG. 3 shows an exploded view of an assembly of the air flow means 10. The housing 16 is formed in two halves that can be snapped together. A pocket with cooling vents 17 in the one half of the housing 16 holds a motor 25. Electrical wires 30 pass through the opening 32 to be connected to the vehicle wiring harness (not shown) to power the fan motor 25 using the vehicle battery. A drive shaft or axle 29 has a slot for accepting a key 27 which fits into a corresponding slot 21 in the hub opening centered on the axis of rotation 22 of the fan 24. Bearing washers 26 are preferably positioned on each side of the fan as shown. The lower half of the housing 16 has a counterbore 18 adapted to hold the washer 26 and clearance opening 19 for the drive shaft or axle 29 to be centered into as shown. The lower half of the housing 16 has two large intake openings or passages 12A to allow into the fan wherein the air is turned 90 degrees by the fan blades 24 and expelled out the exhaust passage 14. When assembled the one or more air flow devices or means 10 can be installed into each front pillar 11 of the vehicle 2. As shown in FIGS. 4 and 5, the housing 16 can be snugly fit into the pillar 11 using preferably a molded plastic or rubber bracket 40 that is glued or otherwise held into the pillar 11 as shown. The other side of the pillar 11 has an exhaust bracket 42 which snugly holds the exhaust passage 14 of the housing 16. The exhaust bracket 42 as shown is snapped onto the pillar 11 to securely hold the assembly. Inlet openings 12 provide the passageway for air to inflow into the openings 12A to the fan blades 24 wherein the air is redirected outwardly in the lateral direction. The pillar 11, as shown, has a cover 13 to close the pillar. The edges of the windshield 4 would be under this cover 13 and be sealed tightly to the vehicle 2 as is conventionally done.

Unlike most prior art devices that provide the air flow from under the hood or bonnet to flow directly up and over the vehicle, the present invention provides the air flow to come from the side pillars 11 and be projected laterally onto the windshield 4 thereafter as the vehicle 2 is traveling at speed the air leaving the air generating means or device 10 is combined with an air flow 32 being impinged upon the windshield 4 such that the driving speed of the vehicle 2 creates a velocity component of air flow 32 that comes over the hood and across the windshield 4 from the bottom to the top. This air flow 32 in combination with the lateral air flow 30 created by the air generating means 10 provides an air flow velocity vector towards the center of the windshield that is directed in more of an upward direction. Accordingly, the lateral air flow 30 is provided with a velocity vector after it leaves the exhaust passage 14 that is complimentarily turned by the vehicle air flow 32 that also provides movement across the windshield 4 vertically once the air flow leaves the air generating means 10 as illustrated. In this fashion the air will traverse across the windshield 4 towards the center of the windshield 4 and as the vehicle 2 increases speed, the combination of the vehicle speed creating an air flow 32 that flows in a vertical direction over windshield is combined with the lateral air flow 30 such that an air barrier or shield is created.

One of the advantages of the present invention is that the lateral air flow 30 provides portions of the windshield 4 that can be provided with an air barrier/shield that will enhance the visibility of both the driver and the passenger particularly close to the corner or side of the windshield. This is particularly important because at stops and at low speeds, the air flow generated by the air flow generating means 10 provides a visibility region for the vehicle 2 to help blow any water or debris to the center. Secondarily as the vehicle 2 increases speed greater than 20 mph, the combination of the vehicle speed air flow 32 and the lateral air flow 30 across the windshield 4 that would normally occur in combination with the laterally flowing air flow 30 provides an air shield that makes the windshield 4 remain virtually clear across the entire surface of the windshield 4 at speeds in excess of 20 mph. These speeds of course are dictated by the rate of rainfall, the amount of rainfall and the velocity of the wind and direction of the rain; however, by providing such a device or means 10, the ability to blow the rain, snow or other debris from the front of the windshield is greatly enhanced. A second benefit of providing the air flow 30 laterally across the windshield 4 is that snow, ice and other debris that are commonly accumulated on the hood of the vehicle 2 will not interfere with the performance of the laterally flowing air across the windshield 4. As such the device can function in virtually any environment regardless of the wind and temperature conditions. Alternatively the device at each pillar 11 can be provided with a heating element such that in addition to creating an air flow exhausted laterally across the windshield, the device can be turned on to assist in defrosting and also de-icing of wiper blades. These and other features of the invention can be modified in any number of ways to provide similar features and benefits, however, it is important that the device provides a lateral air flow. Accordingly, the air flow device emanating from the front pillars 11 across the windshield 4 can be generated by a turbine or air compressor if desired, replacing the fan and motor combination as illustrated. As shown, each fan 20 is provided with a small motor 25 that provides a high speed rotation of the fan blades 24. Alternatively a single motor 25 may drive several of these fan blades 24 and be connected electrically as commonly understood in the art.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. A vehicle in combination with an air flow device for generating an air flow across and in front of a windshield of a vehicle, the air flow device comprising:
   one or more means for generating an air flow located in proximity on a lateral end or side of the windshield, the one or more means for generating an air flow directing the flow of air laterally onto the front of the windshield, wherein the one or more means for generating an air flow has a plurality of fans positioned on the end or lateral side of the windshield, each fan having a plurality of fan blades, the blades having a first end radially close to the axis of rotation, a second end radially opposite the first end and a middle part in between the first and second end, the blades further having a cross section that is radially continuously changing such that the middle part having a wider cross section compared to the second end which cross section is reduced and narrower than the cross section of the middle part, the blades rotatable about an axis for intaking an air flow near the axis of rotation of the fan blade, the air impinging a center internal lower portion of the fan blades adjacent a hub centered on the axis of rotation, the air flow moving initially perpendicular to the fan blades, the air flow impinges upon the internal lower portion of the blade and as the blade extends outwardly from the hub centered on the axis of rotation, the blade curves extending over itself to form an upper portion of the blade starting from the hub, the blade forms an air path extending longitudinally to an open end, the air flow being turned to follow the path of the spinning blades, the fan blades extending longitudinally having a cross section of increasing curvature to a substantially reduced sized terminal open end for capturing and re-directing and accelerating the air flow laterally across a windshield of a moving or stationary vehicle to form an air shield or barrier in front of the windshield.

2. The vehicle in combination with the air flow device of claim 1 wherein each fan has a motor for driving the fan blade.

3. The vehicle in combination with the air flow device of claim 1 further comprises a fan housing having an air intake passage for receiving air and an air exhaust passage for directing the fan-driven air laterally out onto the windshield.

4. A vehicle in combination with an air flow device for generating an air flow across and in front of a windshield of a vehicle, the air flow device comprising:
   one or more means for generating an air flow located in proximity on a lateral end or side of the windshield, the one or more means for generating an air flow directing the flow of air laterally onto the front of the windshield, wherein the one or more means for generating an air flow has a plurality of fans positioned on the end or lateral side of the windshield, each fan having a plurality of fan blades, the blades having a first end radially close to the axis of rotation, a second end radially opposite the first end and a middle part in between the first and second end, the blades further having a cross section that is radially continuously changing such that the middle part having a wider cross section compared to the second end which cross section is reduced and narrower than the cross section of the middle part, the blades rotatable about an axis for intaking an air flow near the axis of rotation of the fan blade, the air impinging a center internal lower portion of the fan blades adjacent a hub centered on the axis of rotation, the air flow moving initially perpendicular to the fan blades, the air flow impinges upon the internal lower portion of the blade and as the blade extends outwardly from the hub centered on the axis of rotation, the blade curves extending over itself to form an upper portion of the blade starting from the hub, the blade forms an air path extending longitudinally to an open end, the air flow being turned to follow the path of the spinning blades, the fan blades extending longitudinally having a cross section of increasing curvature to a substantially reduced sized terminal open end for capturing and re-directing and accelerating the air flow laterally across a windshield of a moving or stationary vehicle to form an air shield or barrier in front of the windshield; and
   a fan housing having an air intake passage for receiving air and an air exhaust passage for directing the fan-driven air laterally out onto the front of the windshield, wherein the fan housing forms a part of or is integral to a front pillar of the vehicle adjacent a lateral side of the windshield and wherein the front pillars include air intake openings or passages which accept air into the opening and thereafter to the means for generating an air flow located within the front pillar.

5. The vehicle in combination with the air flow device of claim 4 wherein the means for generating an air flow is located on each side of the windshield within or on each front pillar of the vehicle.

6. A method of generating an air flow laterally across and in front of a windshield of a vehicle comprises the steps of:
   positioning a means for generating an air flow on each lateral side of the windshield; the means for generating an air flow located on or within the front pillars of a vehicle in proximity on a lateral end or side of the windshield, the one or more means for generating an air flow directing the flow of air laterally onto the windshield, wherein the one or more means for generating an air flow has a plurality of fans positioned in or on each front pillar on the end or lateral side of the windshield, each fan having a plurality of fan blades, the blades having a first end radially close to the axis of rotation, a second end radially opposite the first end and a middle part in between the first and second end, the blades further having a cross section that is radially continuously changing such that the middle part having a wider cross section compared to the second end which cross section is reduced and narrower than the cross section of the middle part, the blades rotatable about an axis for intaking an air flow near the axis of rotation of the fan blade, the air entering into air intake openings on or in each front pillar and impinging a center internal lower portion of the fan blades adjacent a hub centered on the axis of rotation, the air flow moving initially perpendicular to the fan blades, the air flow impinges upon the internal lower portion of the blade and as the blade extends outwardly from the hub centered on the axis of rotation, the blade curves extending over itself to form an upper portion of the blade starting from the hub, the blade forms an air path extending longitudinally to an open end, the air flow being turned to follow the path of the spinning blades, the fan blades extending longitudinally having a cross section of increasing curvature to a substantially reduced sized terminal open end for capturing and re-directing and accelerating the air flow laterally across a windshield of a vehicle to form an air shield or barrier in front of the windshield;

activating the means for generating an air flow; and directing the air flows from each means laterally across the windshield of a moving vehicle toward the center to create the air shield or barrier.

7. The method of generating an air flow of claim 6 further comprises the step of:

driving the vehicle and generating an air flow moving from bottom to top over the windshield to combine with the lateral flow of air to impart a vertically directed air flow velocity displacing a portion of the lateral flowing air over the top of the windshield.

8. The method of claim 7 wherein the windshield is oriented at a low angle of 40 degrees or less and wherein the means for generating an air flow provides a lateral air flow sufficient to clear a viewing area on each side of the windshield at speeds of 20 mph or greater the combination of vehicle generated air flow and lateral air flow substantially clears the entire windshield.

* * * * *